(12) United States Patent
Beavin et al.

(10) Patent No.: US 7,725,448 B2
(45) Date of Patent: May 25, 2010

(54) METHOD AND SYSTEM FOR DISJUNCTIVE SINGLE INDEX ACCESS

(75) Inventors: Thomas A. Beavin, Milpitas, CA (US); Patrick D. Bossman, Alexandria, VA (US); John J. Campbell, Alton (GB); You-Chin Fuh, San Jose, CA (US); Terence P. Purcell, Springfield, IL (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 11/848,868

(22) Filed: Aug. 31, 2007

(65) Prior Publication Data
US 2009/0063397 A1 Mar. 5, 2009

(51) Int. Cl.
G06F 17/30 (2006.01)

(52) U.S. Cl. .................. 707/705; 707/711; 707/716
(58) Field of Classification Search .......... 707/705–716
See application file for complete search history.

(56) References Cited

U.S. PATENT DOCUMENTS

| | | | |
|---|---|---|---|
| 5,590,319 A * | 12/1996 | Cohen et al. .................... 707/4 |
| 5,778,354 A | 7/1998 | Leslie et al. |
| 5,924,088 A | 7/1999 | Jakobsson et al. |
| 6,345,266 B1 | 2/2002 | Ganguly et al. |
| 6,697,961 B1 | 2/2004 | Petrenko et al. |
| 6,826,562 B1 * | 11/2004 | Leung et al. .................... 707/4 |
| 7,127,467 B2 * | 10/2006 | Yalamanchi et al. ........ 707/102 |
| 2002/0095421 A1 * | 7/2002 | Koskas ....................... 707/100 |
| 2003/0100960 A1 | 5/2003 | Edwards et al. |
| 2004/0044662 A1 | 3/2004 | Ganesan et al. |
| 2005/0210023 A1 * | 9/2005 | Barrera et al. .................. 707/5 |
| 2006/0026117 A1 * | 2/2006 | Raman et al. ................... 707/1 |
| 2006/0161579 A1 * | 7/2006 | Venguerov ................... 707/102 |
| 2006/0235818 A1 | 10/2006 | Muras |
| 2007/0083490 A1 | 4/2007 | Au et al. |

FOREIGN PATENT DOCUMENTS

EP 747839 A1 11/1996

* cited by examiner

*Primary Examiner*—Wilson Lee
*Assistant Examiner*—Hanh B Thai
(74) *Attorney, Agent, or Firm*—Dillon & Yudell LLP

(57) ABSTRACT

A method for performing disjunctive single-index access on a database is disclosed. The method includes a query engine determining whether a first OR predicate and a second OR predicate map to a shared index. Responsive to the query engine determining that the first OR predicate and the second OR predicate map to the shared index, the first OR predicate and the second OR predicate are ordered in an ascending sequence. A first range of the first OR predicate is queued. A first row of the shared index is probed for the first range of the first OR predicate. Whether the first row is disqualified by the first OR predicate is determined. Responsive to determining that the first row is not disqualified by the first OR predicate, the row is reported in a result reporting structure. Responsive to determining that the row is disqualified by the first OR predicate, whether the first range of the first OR predicate overlaps a second range of the second OR predicate is determined, and, responsive to determining that the first range of the first OR predicate overlaps the second range of the second OR predicate, the row is checked against second range of the second or predicate.

6 Claims, 2 Drawing Sheets

METHOD AND SYSTEM FOR DISJUNCTIVE SINGLE INDEX ACCESS

BACKGROUND OF THE INVENTION

1. Technical Field

The present invention relates generally to data processing systems and relates specifically to databases. More specifically, the present invention relates to performing disjunctive single-index access on a database in a data processing system.

2. Description of the Related Art

Predicates containing OR conditions present challenges for database management systems in determining the most efficient access to data. One typical approach for improving query performance for such predicates involves exploiting multiple index access as described in "Single Table Access Using Multiple Indexes: Optimization, Execution and Concurrency Control Techniques" by C. Mohan, Don Haderle, Yun Wang, Josephine Cheng. Another alternative involves rewriting the predicates into either conjunctive or disjunctive normal form to best exploit either a single or multiple indexes respectively as described in "Factorizing Complex Predicates in Queries to Exploit Indexes" by Surajit Chaudhuri, Prasanna Ganesan, Sunita Sarawagi.

When the columns referenced are common to each OR predicate, then it may be possible to match these to the same index. For cases where the OR references a single column, such as the structure WHERE C1=? OR C1=? OR C1=?, then database management systems are known to already simplify this to the form WHERE C1 IN (?, ?, ?). Unfortunately, when multiple columns are referenced in the OR, multi-index access may be used and will invoke multiple probes of the same index. The problem with this approach is that ordering is not maintained by the multiple index access steps, and thus a final sort is required if an ORDER BY was specified that could have been satisfied by the index. Since ordering is not maintained, then there is no way to terminate the ORing early if only the first "n" rows are required. This is a common requirement for cursor scrolling applications. An additional limitation of the multi-index access as proposed in the aforementioned article is that index-only access is not supported, even if all required columns are available in the chosen indexes.

Rewriting the predicates into disjunctive normal form promotes exploitation of multi-index access which then introduces the aforementioned limitations, specifically loss of order and inability to terminate early. Rewriting the predicates into conjunctive normal form supports exploitation of single index access which can then support ordering without the requirement for sort. However, the conjunctive predicates may be less selective or may still involve OR'd predicates, and thus full matching of the single index may not be possible.

In addition, many of the existing solutions for improving processing of complex OR predicates involve detailed analysis of overlapping ranges or duplication of filtering which can be consolidated resulting in a reduction of the predicates to be applied. Such processing however requires complex evaluation of such predicates which can add additional overhead to the prepare or runtime processing depending on when the literal values are known.

What is needed is a method, system and computer program product for simplifying the processing of OR'd predicates that can be mapped to a single index.

SUMMARY OF THE INVENTION

A method for performing disjunctive single-index access on a database is disclosed. The method includes a query engine determining whether a first OR predicate and a second OR predicate map to a shared index. Responsive to the query engine determining that the first OR predicate and the second OR predicate map to the shared index, the first OR predicate and the second OR predicate are ordered in an ascending sequence. A first range of the first OR predicate is queued. A first row of the shared index is probed for the first range of the first OR predicate. Whether the first row is disqualified by the first OR predicate is determined. Responsive to determining that the first row is not disqualified by the first OR predicate, the row is reported in a result reporting structure. Responsive to determining that the row is disqualified by the first OR predicate, whether the first range of the first OR predicate overlaps a second range of the second OR predicate is determined, and, responsive to determining that the first range of the first OR predicate overlaps the second range of the second OR predicate, the row is checked against second range of the second or predicate.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1A:
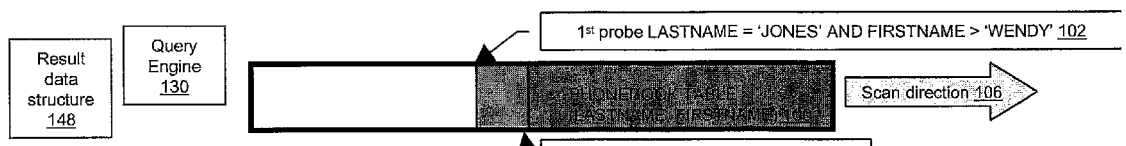
FIG. 1A is a high-level block diagram illustrating an exemplary query engine on a data processing system performing simple scrolling index matching in accordance with a preferred embodiment of the present invention.

With reference now to the figures, and in particular with reference to FIG. 1A, a high-level block diagram illustrating an exemplary query engine on a data processing system performing simple scrolling index matching in accordance with a preferred embodiment of the present invention is depicted.

FIG. 1A depicts a query engine 130 within a data processing system performing a query on a phonebook table 100 using a first probe 102 and a second probe 104. First probe 102 and second probe 104 operate along phonebook table 100 in scan direction 106. Results from first probe 102 and second probe 104 are reported in result data structure 148. As will be apparent to one skilled in the relevant art. query engine 130, phonebook table 100, and result data structure 148 may be located in the same data processing system or in multiple data processing systems connected across a network, which data processing system or systems are not shown, for the sake of clarity, in the embodiments depicted in FIG. 1A-1D.

In the present invention, OR predicates that can be mapped by query engine 130 to the same index of phonebook table 100 will be ordered in ascending sequence of the starting range of each disjunct predicate for first probe 102 and second probe 104, which disjuncted predicates are set to form an IN-list by query engine 130, with no simplification of overlapping ranges required. First probe 102 and second probe 104 will begin with the 1st IN-list range as selected by query engine 130, and proceed to the next range once each range is exhausted by query engine 130.

If an overlap is detected by query engine 130 between subsequent ranges of first probe 102 and second probe 104, and a row within phonebook table 100 is disqualified by the current range of first probe 102, then this row within phonebook table 100 will be checked against the adjacent range(s) by query engine 130 to determine if the row would qualify for the range of second probe 104. Once a disjunct range such as that of first probe 102 is exhausted by query engine 130, probes, such as second probe 104 begin at the next disjunct range determined by query engine 130.

If the next range determined by query engine 130 for second probe 104 is ahead of the current index position of first probe 102 (as per the previous range), then query engine 130 may create a new probe to position at the beginning of this new range. If there was overlap with the prior range of first probe 102, then query engine 130 will initiate second probe 104 at the current index position rather than repositioning within the index to the beginning of the range covered by first probe 102. Any rows that would qualify preceding the current position would have been qualified by the prior range of first probe 102 and reported to result data structure 148, or if disqualified within the earlier range of first probe 102, then the "lookahead" process described above would have determined that this row qualified against the subsequent range of second probe 104.

The present invention allows query engine 130 to generate result data structure 148 while avoiding the complex process of simplifying overlapping or duplicate ranges as is common with predicate rewrite into conjunctive or disjunctive normal form in the prior art. The present invention also allows query engine 130 to maintain ordering, which is of significant importance to scrolling applications, and to terminate the processing early if less than the full result set is required in result data structure 148.

In a preferred embodiment of the present invention, query engine 130 implement the existing IN list processing approach that is used in many database management systems, such as DB2 for z/OS for simple OR predicates on the same column. The present invention allows query engine 130 to extend the IN list implementation to more complex forms of disjunctive predicate. The invention could, in an alternative embodiment, also be implemented using a multi-index access approach provided, that the individual index legs maintain sequential order and communication between the legs is possible to allow early termination of legs that are no longer required and also to check additional legs when there is overlap and the row is disqualified by the current leg.

FIG. 1A depicts query engine 130 scrolling forward through phonebook table 100 to obtaining the next 20 rows based upon the current position of LASTNAME, FIRSTNAME as JONES, WENDY. In the query being performed by query engine 130, the WHERE clause disjunctive predicates are:

WHERE (LASTNAME = 'JONES' AND FIRSTNAME > 'WENDY')
OR LASTNAME > 'JONES'
ORDER BY LASTNAME, FIRSTNAME
FETCH FIRST 20 ROWS ONLY.

In a preferred embodiment of the present invention, query engine 130 converts the disjunctive predicate described above into an IN list predicate assuming an index on LASTNAME, FIRSTNAME that matches the ORDER BY given above. The OR predicates would be converted in ascending order such as: WHERE (LASTNAME, FIRSTNAME) IN ((='JONES', >'WENDY'), (>'JONES')). Because there are 2 "IN" list predicates, query engine 130 uses at most 2 index probes, labeled first probe 102 and second probe 104 to determine position. First probe 102 searches for LASTNAME='JONES' AND FIRSTNAME>'WENDY'. Query engine 130 scans through all remaining JONESes in phonebook table 100 until there are no more rows that qualify the predicates of first probe 102 or query engine 130 stops fetching.

Selected rows from phonebook table 100 appear in the index of phonebook table 100 in ascending order which satisfies the ORDER BY requirement of the predicate given above, and sorting of the rows by query engine 130. Given that the requirement in the predicate above is for query engine 130 to provide the next 20 rows (in this example), then if there are 20 more JONES' in the phone book after Wendy, then the application will stop fetching and second probe 104.

If the requirement for fetching 20 rows is not satisfied by first probe 102, then query engine 130 will deploy second probe 104 against phonebook table 100 on the syntax: LASTNAME>'JONES'. Second probe 104 establishes a new position within phonebook table 100 (which sequentially follows first probe 102 in this example) and query engine 130 scans phonebook table 100 in scan direction 106 until all rows of phonebook table 100 are processed or the required number of rows (20 in this example) of phonebook table 100 are fetched by query engine 130 for inclusion in result data structure 148. Note that, in the example given above, second probe 104 does not contain a predicate on the 2nd column (FIRSTNAME). While it is valid to add a predicate such as FIRSTNAME>=LOW-VALUES for completeness, actually executing this predicate would add additional CPU overhead without any filtering benefit.

Figure 1B:
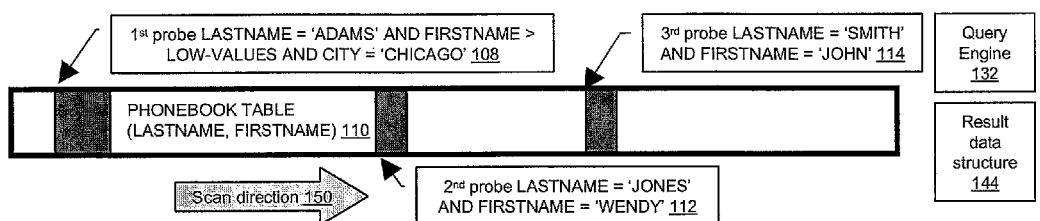
FIG. 1B is a high-level block diagram illustrating an exemplary query engine performing mapping of multiple disjuncts on a single index in accordance with a preferred embodiment of the present invention.

Turning now to FIG. 1B, a high-level block diagram illustrating an exemplary query engine performing mapping of multiple disjuncts on a single index in accordance with a preferred embodiment of the present invention is illustrated. FIG. 1B depicts a query engine 132 performing a query on a phonebook table 110 using a first probe 108, a second probe 112 and a third probe 114. First probe 108, second probe 112 and third probe 114 operate along phonebook table 110 in scan direction 150. Results from first probe 102 and second probe 104 are reported by query engine 132 in result data structure 144.

The second example, depicted in FIG. 1B assumes the following complex WHERE clause:

---
WHERE (LASTNAME = 'JONES' AND FIRSTNAME = 'WENDY')
OR (LASTNAME = 'SMITH' AND FIRSTNAME = 'JOHN')
OR (LASTNAME = 'ADAMS' AND CITY = 'CHICAGO').

---

The common column between all disjuncts is the LASTNAME column. Thus, in a preferred embodiment of the present invention, query engine 132 will map the disjuncts as an IN list to any index of phonebook table 110 that leads with this column. Assuming an index on LASTNAME, FIRSTNAME, CITY, then the disjuncts would be executed as: WHERE (LASTNAME, FIRSTNAME, CITY) IN ((='ADAMS', >=LOW-VALUES, ='CHICAGO'), (='JONES', ='WENDY', >=LOW-VALUES), (='SMITH', ='JOHN', >=LOW-VALUES)).

Note: The syntax '>=LOW-VALUES' was added for missing predicates so that each IN list probe contains 3 predicates to match to the index for readability, although query engine 132 refrains from executing these to avoid unnecessary CPU overhead.

Figure 1C:
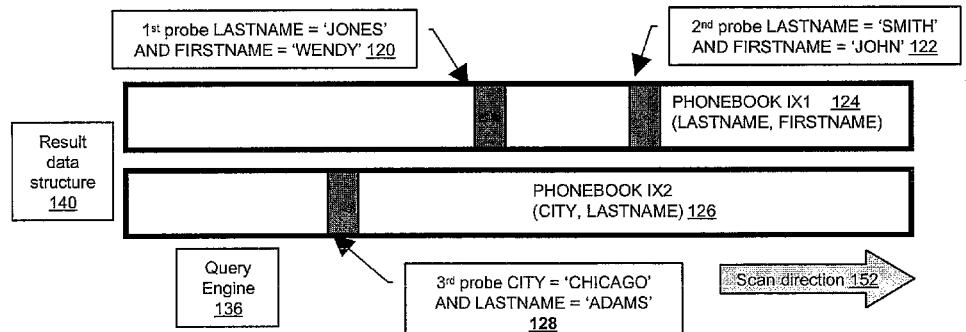
FIG. 1C is a high-level block diagram illustrating an exemplary query engine performing mapping of multiple disjuncts on multiple indexes in accordance with a preferred embodiment of the present invention.

Referring now to FIG. 1C, a high-level block diagram illustrating an exemplary query engine performing mapping of multiple disjuncts on multiple indexes in accordance with a preferred embodiment of the present invention is depicted. FIG. 1C provides alternate indexes for the same predicates as described in FIG. 1B. FIG. 1C depicts a query engine 136 performing a query on a first index on the phonebook table 124 and a second index on the phonebook table 126 using a first probe 120, a second probe 122 and a third probe 128. First probe 120, second probe 122 and third probe 128 operate along first phonebook index 124 and second phonebook index 126 in scan direction 152. Results from first probe 120, second probe 122 and third probe 128 are reported by query engine 136 in result data structure 140.

Multiple indexes exist as first phonebook index IX1 (LASTNAME, FIRSTNAME) 124 and second phonebook index IX2 (CITY, LASTNAME) 126, such as, then query engine 136 considers the two common predicates (on LASTNAME, FIRSTNAME) as candidates for consolidation into the IN list concept of the present invention, and keeps the 3rd predicate (LASTNAME, CITY) to remain as a separate OR predicate to be considered with multi-index access. Query engine 136 determines whether disjuncts are consolidated as per this invention or multi-index access is considered on the basis of how well the predicates match to the available indexes and other factors such as the selectivity difference between mapping to the "best individual index for each disjunct" vs the "best overall index for ALL disjuncts", and also whether the query contains an ORDER BY and/or the requirement is to fetch less than the full result set.

With indexes IX1 (LASTNAME, FIRSTNAME) as first phonebook index 124 and IX2 (CITY, LASTNAME) as second phonebook index 126, then consider consolidating the common disjuncts per index:

---
WHERE (LASTNAME, FIRSTNAME) IN ((= 'JONES', = 'WENDY'),
(= 'SMITH', = 'JOHN'))
OR (LASTNAME = 'ADAMS' AND CITY = 'CHICAGO').

---

FIG. 1C illustrates first probe 120, and second probe 122 consolidated to IX1 as first phonebook index 124, and the 3rd disjunct predicate applied to the separate index IX2 as second phonebook index 126 as third probe 128. Therefore, query engine 136 executes only 2 multi-index steps from the original 3 disjunct predicates.

If an "ORDER BY LASTNAME, FIRSTNAME" syntax is added to the query, then query engine 136 may consider an access plan that maps to a single index, and also a multi-index plan. The query engine 136 would choose the combination that can be executed at lowest cost. When mapping all predicates to the index on LASTNAME, FIRSTNAME 124, query engine 136 can avoid a sort can, although predicates on CITY must be applied on the data rows. Mapping the predicates to the 2 indexes based upon the "best matching" will require a sort. The following demonstrates the 2 separate ways to represent the disjuncts given the available indexes in FIG. 1C. The first maps to LASTNAME, FIRSTNAME index 124 with CITY predicate applied to the data, and the second demonstrates predicates mapped as best matching using both indexes 124 and 126

---
WHERE (LASTNAME, FIRSTNAME, CITY) IN ((= 'ADAMS', >=
LOW-VALUES, = 'CHICAGO'), (= 'JONES', = 'WENDY', >=
LOW-VALUES), (= 'SMITH', = 'JOHN', >= LOW-VALUES))
"OR"
WHERE (LASTNAME, FIRSTNAME) IN ((= 'JONES', = 'WENDY'),
(= 'SMITH', = 'JOHN'))
OR (LASTNAME = 'ADAMS' AND CITY = 'CHICAGO')

---

Adding "FETCH FIRST n ROWS ONLY or OPTIMIZE FOR n ROWS" encourages query engine 136 to take the sort avoidance access path, because this path provides the capability to terminate the data retrieval and report a result to result data structure 140 before the full result set is retrieved. As mentioned previously, query engine 136 makes this decision based on cost (using a DBMS optimizer).

Figure 1D:
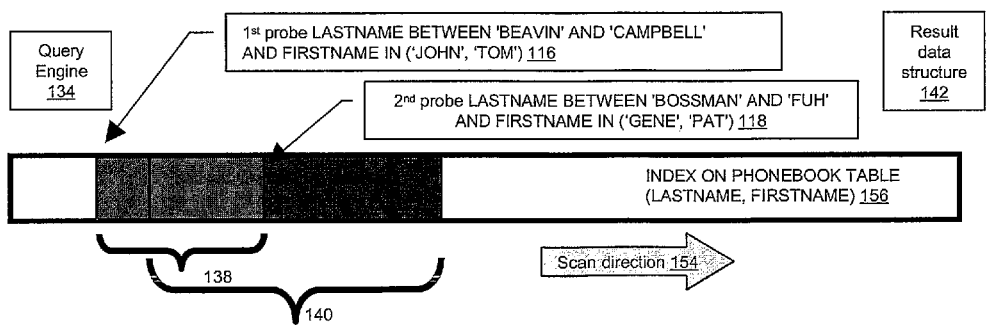
FIG. 1D is a high-level block diagram illustrating an exemplary query engine performing mapping of disjuncts with overlapping ranges in accordance with a preferred embodiment of the present invention.

Turning now to FIG. 1D, a high-level block diagram illustrating an exemplary query engine performing mapping of disjuncts with overlapping ranges in accordance with a preferred embodiment of the present invention is illustrated. FIG. 1A depicts a query engine 134 within a data processing system performing a query with an index on the phonebook table 156 using a first probe 116 and a second probe 118. First probe 116 and second probe 118 operate along phonebook table 156 in scan direction 154 through first range 138 and second range 140, respectively. Results from first probe 116 and second probe 118 are reported in result data structure 142. Note that query engine 134, phonebook index 156, and result data structure 142 may be located in the same data processing system or in multiple data processing systems connected across a network.

In a preferred embodiment of the present invention, when predicate ranges from multiple disjuncts, such as first range 138 for first probe 116 and second range 140 for second probe 118 overlap, instead of performing a complex consolidation process, query engine 134 orders the disjuncts in ascending order as performed for simpler disjuncts. When overlaps occur between consecutive ranges, query engine 134 marks the ranges as having an overlap, and, if the current row is disqualified within the current range, then query engine 134 checks that row against the subsequent range, without losing index position. Where query engine 134 is aware of actual overlap position between first range 138 for first probe 116 and second range 140 for second probe 118 is known, query engine 134 performs the process of checking the subsequent range(s) only when the current index position dictates that it is required. When the current range is exceeded, then index processing against the subsequent overlapping range will begin at the current index position, and not at the beginning of the range.

For example, assume the following disjuncts and index on LASTNAME, FIRSTNAME:

---

WHERE (LASTNAME BETWEEN 'BOSSMAN' AND 'FUH' AND FIRSTNAME IN ('GENE', 'PAT'))
OR (LASTNAME BETWEEN 'BEAVIN' AND 'CAMPBELL' AND FIRSTNAME IN ('JOHN', 'TOM')).

---

The predicate given above is represented query engine 134 in ascending sequence based upon the beginning of each range as (LASTNAME, FIRSTNAME) IN ((BETWEEN 'BEAVIN' AND 'CAMPBELL', IN ('JOHN', 'TOM')), (BETWEEN 'BOSSMAN' AND 'FUH', IN ('GENE', 'PAT')). First probe 116 will position on LASTNAME of 'BEAVIN' and scan forward checking the FIRSTNAME value for each row of phonebook index 156 in the range to see if this qualifies as 'JOHN' or 'TOM'. Once query engine 134 reaches the index position overlapping position of LASTNAME of 'BOSSMAN', then if a row does not qualify against the first range (FIRSTNAME IN ('JOHN', 'TOM')), then the 2nd range predicates will also be checked (FIRSTNAME IN ('GENE', 'PAT')) to determine if the row qualifies. Provided the row falls within both ranges, then both sets of predicates will be checked before a row can be disqualified by query engine 134.

Once query engine 134 detects that the index scan position exceeds the first range 138 for first probe 116 of LASTNAME of 'CAMPBELL', then processing begins with the second range 140 for second probe 118. However, because the overlapping values of the second range 140 for second probe 118 were already processed by first probe 116 for first range 138. Second probe 118 will begin at the current index position, and not the beginning of the range.

As demonstrated, the present invention move the complexity of simplifying overlapping ranges from the access path selection process to the execution component of the DBMS.

Figure 2:
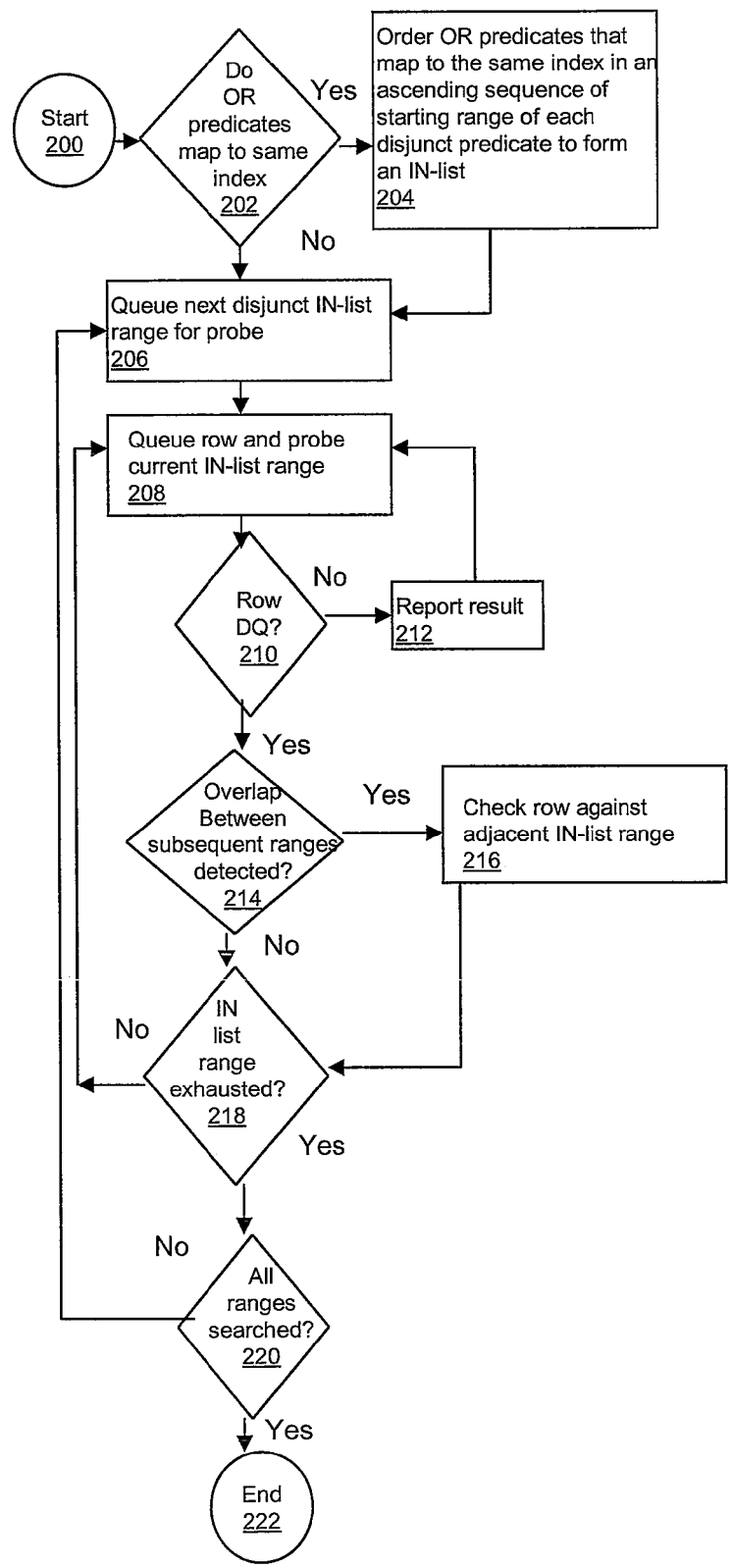
FIG. 2 is a high-level flow diagram depicting steps performed during disjunctive single-index access in accordance with the present invention.

FIG. 2 is a high-level flow diagram depicting steps performed during disjunctive single-index access in accordance with the present invention. The process begins at step 200, and then proceeds to step 202, which depicts query engine 130 determining whether OR predicates for first probe 102 and second probe 104 map to a common index on phonebook table 100. If OR predicates for first probe 102 and second probe 104 map to a common index on phonebook table 100, then the process next moves to step 202, which illustrates query engine 130 ordering OR predicates for first probe 102 and second probe 104 that map to a common index on phonebook table 100 in an ascending sequence of the starting range of each disjunct predicate to form an IN-list. The process then proceeds to step 206, which is described below.

Returning to step 202, if OR predicates for first probe 102 and second probe 104 do not map to a common index on phonebook table 100, then the process next moves to step 206. Step 206 illustrates query engine 130 queueing a next disjunct IN-list range for probe by first probe 102 or second probe 104. The process then proceeds to step 208, which depicts query engine 130 queueing a row of phonebook table 100 and probing the IN-list range identified in step 206 for probe by first probe 102 or second probe 104. The process next moves to step 210. Step 210 illustrates query engine 130 determining whether a row of phonebook table 100 is disqualified by the IN-list range represented by the probe queued in step 206 from first probe 102 and second probe 104. If query engine 130 determines that a row of phonebook table 100 is not disqualified by IN-list range represented by the probe queued in step 206 from first probe 102 and second probe 104, then the process proceeds to step 212, which depicts query engine 130 reporting the result of step 208 to result data structure 148. The process then returns to step 208, which is described above.

Returning to step 210, if query engine 130 determines that a row of phonebook table 100 is disqualified by IN-list range represented by the probe queued in step 206 from first probe 102 and second probe 104, then the process proceeds to step 214. Step 214 illustrates query engine 130 determining whether overlap exists between subsequent ranges of first probe 102 and second probe 104, such as first range 138 and second range 140 of first probe 116 and second probe 118, respectively. If query engine 130 determines that overlap exists between subsequent ranges of first probe 116 and second probe 118, then the process proceeds to step 216. Step 216 illustrates query engine checking the selected row of phonebook index 156 against adjacent IN-list range between first range 138 and second range 140 of first probe 116 and second probe 118. The process then proceeds to step 218, which is described below.

Returning to step 214, if query engine 130 determines that no overlap exists between subsequent ranges of first probe 116 and second probe 118, then the process proceeds to step 218, which depicts query engine 130 determining whether the current IN-list range is exhausted for all rows of phonebook table 100 for the IN-list range represented by the probe queued in step 206 from first probe 102 and second probe 104. If query engine 130 determines that the current IN-list range is not exhausted for all rows of phonebook table 100 for the IN-list range represented by the probe queued in step 206 from first probe 102 and second probe 104, then the process returns to step 208, which is described above. Alternatively, at step 218, if query engine 130 determines that the current IN-list range is exhausted for all rows of phonebook table 100 for the IN-list range represented by the probe queued in step 206 from first probe 102 and second probe 104, then the process proceeds to step 220, which illustrates query engine 130 determining if all ranges for first probe 102 and second probe 104 have been searched. If query engine 130 determines that all ranges for first probe 102 and second probe 104 have not been searched, then the process returns to step 206, which is described above. Alternatively, at step 220, query engine 130 determines that all ranges for first probe 102 and second probe 104 have been searched, then the process ends at step 222.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. In a data processing system, a method for performing disjunctive single-index access on a database, said method comprising:

a query engine determining whether a first OR predicate and a second OR predicate map to a shared index;

responsive to said query engine determining that said first OR predicate and said second OR predicate map to said shared index, ordering said first OR predicate and said second OR predicate in an ascending sequence;

queuing a first range of said first OR predicate;

probing a first row of said shared index for said first range of said first OR predicate;

determining whether said first row is disqualified by said first OR predicate;

responsive to determining that said first row is not disqualified by said first OR predicate, reporting said row in a result reporting structure;

responsive to determining that said row is disqualified by said first OR predicate, determining whether said first range of said first OR predicate overlaps a second range of said second OR predicate; and responsive to determining that said first range of said first OR predicate overlaps said second range of said second OR predicate, checking said row against second range of said second or predicate.

2. The method of claim 1, further comprising determining whether a second row of said shared index remains to be searched.

3. The method of claim 1, determining whether said first row is disqualified by said second OR predicate.

4. A data processing system comprising:

query engine for determining whether a first OR predicate and a second OR predicate map to a shared index and a processor for responsive to said query engine determining that said first OR predicate and said second OR predicate map to said shared index, ordering said first OR predicate and said second OR predicate in an ascending sequence;

queuing a first range of said first OR predicate;

probing a first row of said shared index for said first range of said first OR predicate;

determining whether said first row is disqualified by said first OR predicate;

responsive to determining that said first row is not disqualified by said first OR predicate, reporting said row in a result reporting structure;

responsive to determining that said row is disqualified by said first OR predicate, determining whether said first range of said first OR predicate overlaps a second range of said second OR predicate; and responsive to determining that said first range of said first OR predicate overlaps said second range of said second OR predicate, checking said row against second range of said second or predicate.

5. The data processing system of claim 4, wherein said processor further determines whether a second row of said shared index remains to be searched.

6. The data processing system of claim 4, wherein said processor further determines whether said first row is disqualified by said second OR predicate.

* * * * *